United States Patent [19]

Hayes et al.

[11] Patent Number: 5,359,019

[45] Date of Patent: Oct. 25, 1994

[54] USE OF POLYETHYLENICALLY UNSATURATED MONOMERS IN POLYMERS POLYOL DISPERSANTS

[75] Inventors: John E. Hayes, Wilmington, Del.; Robert G. Gastinger, West Chester, Pa.

[73] Assignee: Arco Chemical Technology, L.P., Greenville, Del.

[21] Appl. No.: 525,269

[22] Filed: May 17, 1990

[51] Int. Cl.$^5$ .................. C08F 222/40; C08F 220/10; C08F 236/06; C08F 212/08; C08K 5/06
[52] U.S. Cl. .................. 526/262; 526/328; 526/335; 526/346; 524/762
[58] Field of Search .............. 526/262, 328, 335, 346; 524/762

[56] References Cited

U.S. PATENT DOCUMENTS

| | | | |
|---|---|---|---|
| 4,119,586 | 10/1978 | Shah | 521/137 |
| 4,242,249 | 12/1980 | Van Cleve et al. | 260/33.2 |
| 4,327,005 | 4/1982 | Ramlow et al. | 524/377 |
| 4,334,049 | 6/1982 | Ramlow et al. | 526/202 |
| 4,350,780 | 9/1982 | Van Cleve et al. | 521/137 |
| 4,357,430 | 11/1982 | Van Cleve | 521/128 |
| 4,652,589 | 3/1987 | Simroth et al. | 521/137 |
| 4,737,568 | 4/1988 | Stenzenberger | 528/170 |
| 4,745,153 | 5/1988 | Hoffman | 524/762 |
| 4,831,076 | 5/1989 | Lidy et al. | 524/701 |

FOREIGN PATENT DOCUMENTS

| | | | |
|---|---|---|---|
| 58-183748 | 10/1983 | Japan | C08L 79/08 |
| 8703886 | 7/1987 | PCT Int'l Appl. | C08F 2/06 |

*Primary Examiner*—Joseph L. Schofer
*Assistant Examiner*—Wu C. Cheng
*Attorney, Agent, or Firm*—David L. Mossman; Dennis M. Kozak

[57] ABSTRACT

Monomers having at least two reactive ethylenically unsaturated sites may be polymerized via a free-radical reaction in the presence of a polyol to produce a dispersant useful in preparing polymer polyols that find uses as coreactants to produce polyurethane foams. The monomers include, but are not limited to, polyethylenically unsaturated maleimides and acrylates. The dispersants prepared in this manner can be used in very small quantities, about 2 to 5 wt. % of the total polyol and still produce a styrene/acrylonitrile polymer polyol with high solids and high styrene levels.

35 Claims, No Drawings

USE OF POLYETHYLENICALLY UNSATURATED MONOMERS IN POLYMERS POLYOL DISPERSANTS

FIELD OF THE INVENTION

The invention relates to the polymer polyols useful in the synthesis of polyurethane compositions, and in one aspect, is more particularly related to novel dispersants containing polymers from polyethylenically unsaturated monomers, which dispersants are employed in polymer polyols.

BACKGROUND OF THE INVENTION

Polyurethane foams, formed by the reaction of a polyisocyanate with a polyhydroxyl-containing compound in the presence of a suitable catalyst, are widely accepted as padding materials for cushions in furniture, automobiles and the like. Polyurethane foams are also used in sponges, personal care and hygiene items and as specialty packaging materials.

The use of a polyol in the preparation of polyurethanes by reaction of the polyol with a polyisocyanate in the presence of a catalyst and perhaps other ingredients is well known. Conventional polyols for flexible polyurethane foams, such as slab urethane foams, are usually made by the reaction of a polyhydric alcohol with an alkylene oxide, usually ethylene oxide and/or propylene oxide, to a molecular weight of about 2,000 to 5,000 and above. Polyols have been modified in many ways in attempts to improve the properties of the resulting polyurethane, for example, by using a polymer polyol as the polyol component. Conventional polyols may be used as the dispersing media or base polyol in these polymer polyols.

For example, dispersions of polymers of vinyl compounds such as styrene, acrylonitrile or a mixture of the two (abbreviated as SAN), or of polyurea polymers, such as those prepared from toluene diisocyanate (TDI) and hydrazine in conventional polyols have been included to improve the properties of the polyols, and thus, the properties of the resulting foam. Polyurethane foams with higher load bearing properties (ILD-indentation load deflection, and CFD-compression force deflection) may be produced in this manner. It would be desirable if polymer polyols could be prepared which would be stable and have low viscosities. Stability is important to the storage life of the polyols before they are used to make the polyurethane foams. The tendency of polymer polyols to undergo phase separation if they are not stabilized is well known. Dispersants are often used to help keep the polymers in the dispersion. Low viscosities and small particle sizes are also important in a good quality polyol to permit it to be pumped easily in high volume foam producing equipment.

It would further be desirable if styrene/acrylonitrile polymer polyols could be synthesized which would have large SAN ratios. The substitution of styrene for acrylonitrile in these polymer polyols helps prevent discoloration during the cure of the polyurethane, and also helps improve flame retardability of the resultant foams. However, the stability of the polymer polyols decreases with increasing styrene to acrylonitrile ratios. Viscosity and particle size are also typically adversely affected by high styrene contents.

It is known to polymerize monomers in the presence of polyols to make dispersants in turn used in polymer polyol preparation. For example, International Publication No. WO 87/03886 and U.S. Pat. No. 4,745,153 teach the homo- or co-polymerization of vinyl-terminated polyol adducts alone or together with an ethylenically unsaturated monomer or monomer mixture in the presence of an active hydrogen-containing compound as a solvent, and their use as preformed dispersants. Preformed stabilizers comprising a copolymer of an anchor portion consisting of an ethylenically unsaturated monomer or mixture of such monomers and a solvatable portion consisting of a propylene oxide polymer are described in U.S. Pat. Nos. 4,242,249 and 4,350,780. Only monofunctional materials are used in these products.

See also U.S. Pat. Nos. 4,327,005 and 4,334,049 to Ramlow, et al., which teach alkylene oxide adducts of styrene/allyl alcohol copolymers as preformed stabilizers for polymer polyols. The stabilizers may take the form of a graft copolymer dispersion or a finely divided solid polymer.

It is known in the art that dispersants for polymer polyols can be prepared by coupling polyols together through their hydroxyl groups. For example, U.S. Pat. No. 4,357,430 teaches that a coupled polyol consisting of the reaction product of a polyol with a polyisocyanate is suitable as a dispersant. U.S. Pat. No. 4,831,076 discloses a modified polyol obtained by the reaction of a polyol with a coupling agent having at least two functional groups which are reactable with the hydroxyl groups on the polyol which is used as a dispersant for polymer polyols.

It is well known in the art that high styrene content polymer polyols are desirable, but difficult to prepare in stable form. It has been discovered that the polymerization reaction product of polyethylenically unsaturated monomers in a base polyol may be useful themselves as dispersants in preparing polymer polyols that have relatively high styrene contents, but which also had good stability, small particle sizes, and low viscosity as well.

SUMMARY OF THE INVENTION

Accordingly, it is an object of the present invention to provide a polymer polyol dispersant that is made using a polyethylenically unsaturated monomer, but which requires only a small amount of monomer to be effective.

It is another object of the present invention to provide a polymer polyol dispersant which, in turn, only needs to be present in a small amount in the polymer polyol to be effective.

It is yet another object of the invention to provide a polymer polyol dispersant that does not require coupling of the polyols through their hydroxyl groups.

In carrying out these and other objects of the invention, there is provided, in one form, a polymer polyol dispersant produced by a process of polymerizing, via a free-radical reaction, at least one monomer having at least two ethylenically unsaturated sites, in the presence of a polyol.

DETAILED DESCRIPTION OF THE INVENTION

It has been discovered that a new class of polymer polyol dispersants may be prepared which can be used to prepare high solids, high styrene, styrene/acrylonitrile (SAN) dispersions of polyether polyols. These dispersants are prepared by the free radical polymerization of multi- or polyethylenically unsaturated monomers in the presence of polyols. The dispersants have the advantages that only a small amount of the multifunctional monomer is required in the dispersant, and, additionally, only a small amount of the dispersants is required as a percentage of the total polyols to produce SAN polymer polyols, since the dispersants are very active. Further, the synthesis of these dispersants does not require the coupling of polyols through their hydroxyl groups making them attractive alternative materials.

The monomers must have at least two reactive ethylenic or unsaturated sites, that is, at least two carbon-carbon double bonds in the molecule that are reactive in a free-radical reaction. Such materials include, but are not limited to, polyethylenically unsaturated maleimides and polyethylenically unsaturated acrylates.

The polyethylenically unsaturated monomers may have the structure:

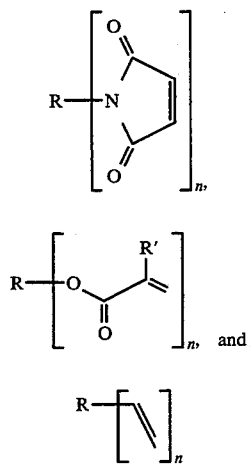

where R is selected from the group of organic moieties comprising alkyl, aryl, alkylaryl groups and alkyl, aryl or alkyl aryl groups linked by a hetero atom-containing group; R' is hydrogen or methyl and n is at least 2. In one aspect, R is selected from the group consisting of:

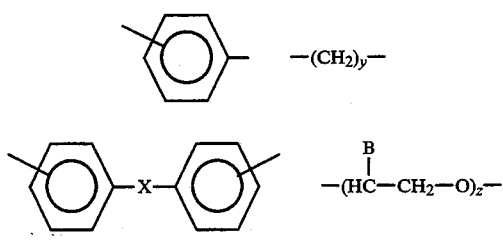

where X is selected from the group consisting of O, $SO_2$, $C=O$, $CH_3$, $C(CH_3)_2$, and $C(CF_3)_2$; y ranges from about 1 to about 24; z ranges from about 1 to about 100; and B is selected from the group consisting of hydrogen and methyl. It is preferred that the monomer be a bismaleimide, that is having two maleimide groups, although as taught above, it may have more than two.

Another class of preferred ethylenically unsaturated monomers are the (meth)acrylic esters of polyols, including but not limited to, materials such as trimethylolpropane triacrylate (TMPTA); trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; tripropylene glycol dimethacrylate; polypropylene glycol diacrylate; polyethylene glycol diacrylate; butanediol diacrylate; butanediol dimethacrylate; pentaerythritol triacrylate; pentaerythritol tetraacrylate; ethoxylated bisphenol A diacrylate; hexane diol diacrylate; dipentaerythritol monohydroxypentaacrylate; neopentyl glycol diacrylate; neopentyl glycol dimethacrylate; tris(2-hydroxyethyl)isocyanurate triacrylate and the like.

Other suitable polyethylenically unsaturated monomers include diallyl carbonate; diallyl maleate; diallyl phthalate; diallyl ether; divinyl benzene and the like.

Of course, materials which fall within the broad definition given above, but which are not explicitly recited are included herein. Mixtures of these monomers are also anticipated.

The preparation of the dispersants may be accomplished by polymerizing the polyethylenically unsaturated monomers in a polyol. The preparation of the dispersants is versatile. The content of the polyethylenically unsaturated monomers need only range from about 0.1 to about 10 wt. %, based on the total dispersant. The exact content can vary depending on the polyol, reaction conditions, and reactivity of the monomer. Optionally, some monoethylenically unsaturated monomer may be added with the polyethylenically unsaturated monomer. The dispersant preparation may be carried out at a temperature in the range of from about 60° to about 180° C., where a preferred temperature range is from about 90° to about 140° C. The catalyst type and concentration can be the same as those described for polymer polyol preparation. It is preferred to use conditions which promote grafting of the monomers onto the polyol. The reaction may be carried out in the presence of a solvent. The polyol used may also be the same as those described for polymer polyols. In general, higher molecular weight polyols and higher functionality polyols provide better dispersants. In one aspect of the invention, the polyol does not need to contain induced unsaturation. In another aspect of the invention, the polyol may contain induced unsaturation.

The reactive conditions of temperature and pressure to make the polymer polyol dispersions themselves may be selected by the invention practitioner to meet the desired specifications required by the polymer polyols. A pressure range of about 0 to 50 psig and a temperature of from about 50° to about 150° C. are representative, but not limiting, conditions for the making of the polymer polyols.

For polymer polyol preparation, it has been discovered that these dispersants are unusually active and thus may be used in relatively small quantities, such as from about 0.5 to 30 wt. % based on the total composition; preferably from about 2 to 20 wt. %, most preferably from about 2 to 10 wt. %. The solids content of the resultant polymer polyol may vary from about 10 to about 55 wt. %, preferably from about 20 to about 45 wt. %. The styrene/acrylonitrile ratio, if these are the monomers used, may vary from about 40/60 to even 100/0, although 75/25 may be more typical, depending on the solids content.

The base polyol for the polymer polyol is the major portion of the polyol material used, whereas the dispersant is a minor portion of the total polyol material used. Suitable base polyols are described below. The ratio of total base polyol (including all portions, if multiple proportions are used) to dispersant ranges from about 50/50 to about 99/1, and preferably from about 70/30 to about 99/1.

Any suitable addition time of the feed stream to the reactor contents may be employed, for example, the addition time may range from 0.5 to 4.0 hours, preferably from 1 to 2.5 hours. The proportion of the polymerization initiator as a wt. % of the total reactants may range from about 0.05 to about 5.0 wt. %, preferably from about 0.1 to about 1.0 wt. %.

The reactor for making the polymer polyols of this invention may be a batch reactor, a semi-batch reactor or one or more continuous stirred tank reactors (CSTRs). In one aspect of this invention, if a semi-batch reactor is used, the dispersant may comprise all of the initial reactor charge. Alternatively, the initial reactor charge may comprise the dispersant and a first portion of the base polyol. The dispersant may be diluted with a first portion of base polyol up to a ratio of 1 to 50 with the remainder of the base polyol added as a second portion with the feed charge. In a preferred embodiment, when two portions of base polyol are used, the first portion is less than the second portion. When two portions of base polyol are used, the ratio of the first portion to second portion may range from 1/99 to 50/50, preferably from 10/90 to 35/65. The dispersant is most effective when added with the initial reactor charge but is also effective if a portion is added with the feed charge. It is desirable to have a high initial concentration of dispersant in the reactor but initial concentrations as low as about 5% are effective with about 10 to about 30% typical. In another aspect of the invention, if CSTRs are employed, the base polyol need not be added in two portions, but may be added in one portion. In yet another aspect of the invention, two or more CSTRs in series may be employed to advantage, for example, if a particular sequence of component additions is advantageous. Due to the robust nature of the dispersants of the invention, it is expected that the polymer polyols made according to the process herein may also be performed in a single stage CSTR. In some cases, the use of one CSTR may be especially preferred.

In more detail, and in one aspect of the invention, both the dispersant polyol and the base polyol may be the same or different and may have a molecular weight of from about 500 to 15,000, preferably from about 2000 to 10,000, and are typically made by the reaction of an initiator having a plurality of reactive hydrogens thereon with one or more alkylene oxides. Suitable initiators include, but are not limited to, glycerin, alkanolamines, alkylamines, aryl or aromatic mines, sucrose, sorbitol, trimethylol propane (TMP) α-methylglucoside, β-methylglucoside or other methylglucoside, resins of phenol, aniline and mixed phenol aniline, such as methylenedianiline or bisphenol A, Mannich condensates and mixtures thereof, for example. The first or second polyol may be made by alkoxylating the initiator with a desired number of moles of an alkylene oxide. Preferably, the alkylene oxide has two to four carbon atoms, and is thus ethylene oxide, propylene oxide, butylene oxide or mixtures of these oxides. In one aspect of the invention, propylene oxide is particularly preferred. The oxides may be mixed upon addition, or may be added to the polyol initiator chain separately to form blocks or caps. In a preferred aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein.

The polymerization initiator for both the dispersant preparation and the polymer polyol preparation may be any suitable initiator for the particular monomers employed. Suitable catalytic initiators useful in producing the polymer polyol compositions of this invention are the free radical type of vinyl polymerization catalysts, such as the peroxides, persulfates, perborates, percarbonates, azo compounds, and the like. Specific examples include, but are not limited to, 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate,t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate, 2,2'-azo-bis(2-methylbutanenitrile) for example. Other suitable catalysts may be employed, of course. A preferred class of catalysts for the dispersant preparation is the peroxides.

The preferred second monomers employed in the method and polymer polyols of the present invention are both styrene and acrylonitrile to make the well-known copolymer. Other suitable monomers include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene substituted styrenes, such as cyanostyrene, phenylstyrene, cyclohexylstyrene, benzylstyrene, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethoxyacrylate, methyl α-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl surfone, N-methyl-N-vinyl acetamide, N-vinylpyrrolidone, vinyl imidazole, divinyl sulfide, divinyl sulfoxide, divinyl sulfone, sodium vinyl suffonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, maleic anhydride, maleimide, N-substituted maleimides, such as N-phenylmaleimide and the like.

The dispersants and polymer polyols of the invention will be further illustrated with reference to the following examples, which are merely meant to exemplify and not define the invention.

Procedures for Measurements of Physical Properties of Polymer Polyols

Viscosity was measured using a Brookfield cone and plate viscometer, Spindle #CP-52, operated at 20 secs$^{-1}$ at 25° C.

Particle sizes were measured using a Coulter N4 Particle Size Analyzer with o-xylene or isopropyl alcohol as the dispersing media.

Centrifugable solids were determined by centrifuging a sample of the polymer polyol for about 24 hours at about 3300 rpm and 1470 radial centrifugal "g" forces. The centrifuge tube was then inverted and allowed to drain for 4 hours. The non-flowing cake at the bottom of the tube is reported as weight percent of the initial weight of the sample tested.

Preparation of Dispersants

Into a reactor fitted with a stirrer, condenser, thermometer and addition tube and under a blanket of nitrogen were charged the amounts of reactants indicated in Table I. After heating the reactor charge to the reaction temperature, the feed charge was added over the indicated time period. Upon completion of the addition, the reaction product was held at the reaction temperature for 0.5 to 1.0 hour, then stripped of residual monomers for 1.0 hour at 115°–125° C. and <5 mm Hg.

Note that in Examples 9 through 16 and 18 relatively low amounts of the dispersants of Examples 1 through 8 and 17 are used (3–5 wt. %) to give excellent polymer polyols with low viscosities and high solids contents. The SAN ratios for all polymer polyols was set at 75/25, although it is anticipated that ratios higher than this might be achieved.

TABLE I

Dispersant Preparations

| | Example No. | | | | | | | |
|---|---|---|---|---|---|---|---|---|
| | 1 | 2 | 3 | 4 | 5 | 6 | 7 | 8 |
| Monomer charge, wt. % | 2.0 | 3.0 | 3.0 | 2.0 | 3.0 | 2.0 | 2.5 | 2.0 |
| Base polyol | B | B | B | B | B | B | B | B |
| Reaction Temp., °C. | 120 | 120 | 120 | 120 | 120 | 120 | 120 | 120 |
| Initiator Conc., Wt. % | 1.0 | 1.0 | 1.0 | 0.5 | 1.0 | 0.99 | 1.0 | 2.0 |
| Feed, Addition time, h. | 1.5 | 1.0 | 1.0 | 1.5 | 1.5 | 1.0 | 1.0 | 1.0 |
| Feed, g. | | | | | | | | |
| bis-Maleimide[1] | 7.5 | 15.0 | 15.0 | 10.0 | 15.0 | 15.0 | 18.75 | 13.0 |
| Chlorobenzene | — | — | 150 | — | — | 150 | 150 | 130 |
| Vazo ® 67 | — | — | — | 2.5 | 5.0 | — | — | — |
| BPO[2] | 3.75 | 5.0 | 5.0 | — | — | 7.5 | 7.5 | 13.0 |
| Xylene | 200 | 180 | — | 200 | 200 | — | — | — |
| Base polyol | 267.5 | 285 | — | 400 | 395 | 660 | 651 | 567 |
| Reactor charge, g. | 100 | 200 | 485 | 90 | 90 | 80 | 80 | 90 |
| Base polyol | | | | | | | | |
| Dispersant properties Viscosity, cps, 20/sec. | 12,000 | 14,500 | 7420 | 6590 | 24,200 | 3880 | 7570 | 5500 |

[1]1,1'-(methylenedi-4,1-phenylene)bis-maleimide.
[2]Benzoyl peroxide.

TABLE II

Polymer Polyol Preparations

| | Example | | | | | | | |
|---|---|---|---|---|---|---|---|---|
| | 9 | 10 | 11 | 12 | 13 | 14 | 15 | 16 |
| Monomer Charge, wt % | 40 | 30 | 30 | 40 | 40 | 30 | 35 | 35 |
| SAN Weight ratio | 75/25 | 75/25 | 75/25 | 75/25 | 75/25 | 75/25 | 75/25 | 75/25 |
| Base Polyol | C | A | A | C | C | A | A | A |
| Dispersant from Ex. | 1 | 1 | 2 | 2 | 7 | 7 | 8 | 1 |
| % Dispersant of Total Polyol | 3.0 | 5.0 | 5.0 | 4.0 | 3.0 | 4.6 | 5.0 | 5.0 |
| % of Total Polyol in Feed | 92 | 90 | 80 | 85 | 85 | 70 | 80 | 80 |
| Reaction Temp., °C. | 120 | 120 | 120 | 120 | 120 | 120 | 120 | 120 |
| Initiator Conc., wt. % | 0.6 | 0.25 | 0.5 | 0.9 | 0.9 | 0.5 | 0.5 | 0.5 |
| Feed addition time, h. | 1.5 | 1.5 | 1.5 | 1.5 | 2.0 | 2.0 | 2.0 | 2.0 |
| Feed, g. | | | | | | | | |
| Styrene | 600 | 450 | 450 | 600 | 600 | 450 | 525 | 525 |
| Acrylonitrile | 200 | 150 | 150 | 200 | 200 | 150 | 175 | 175 |
| Vazo 67 | 12.0 | 5.0 | 10.0 | 18.0 | 18.0 | 10.0 | 10.0 | 10.0 |
| Base Polyol | 1100 | 1260 | 1120 | 1020 | 1020 | 980 | 1040 | 1040 |
| Reactor Charge, g. | | | | | | | | |
| Base Polyol | 64 | 70 | 210 | 132 | 144 | 355 | 195 | 195 |
| Dispersant | 36 | 70 | 70 | 48 | 36 | 65 | 65 | 65 |
| Dispersion Properties | | | | | | | | |
| Conversion, % overall | 98 | 97 | 97 | 98 | 96 | — | 97 | 97 |
| Viscosity, cps, 20/sec | 5210 | 3150 | 3810 | 5360 | 5210 | 3150 | 4740 | 4810 |
| Particle size, μ | 0.94 | 0.54 | 0.33 | 0.50 | — | 0.39 | 0.45 | 0.43 |
| Centrifugable solids, | 6.4 | 2.9 | 2.7 | 3.4 | 8.1 | 2.7 | 4.6 | 3.8 |

TABLE II-continued

| | Polymer Polyol Preparations | | | | | | | |
|---|---|---|---|---|---|---|---|---|
| | Example | | | | | | | |
| | 9 | 10 | 11 | 12 | 13 | 14 | 15 | 16 |
| wt. % | | | | | | | | |

EXAMPLES 17 AND 18

Trifunctional Monomer in Dispersant for Polymer Polyols

Example 17 is an illustration of the use of trimethylolpropane triacrylate (TMPTA) as a triethylenically unsaturated monomer for polymerization within a first base polyol to make a dispersant, in accordance with the procedures of Examples 1 through 8. The dispersant in Example 17 is then used to make the polymer polyol of Example 18.

| Example 17 | | Example 18 | |
|---|---|---|---|
| Base Polyol | D | % Monomers | 30 |
| % Triacrylate | 3 | SAN ratio | 75/25 |
| Reactor charge, g. | 870 | Base polyol | A |
| Polyol | | % Dispersant | 5 |
| Feed Charge, g. | | % Polyol in feed | 75 |
| Polyol | 100 | Reactor Charge, g. | |
| TMPTA | 30 | Base Polyol | 280 |
| BPO | 15 | Dispersant | 70 |
| THF | 60 | Feed Charge, g. | |
| Dispersant Properties | | Styrene | 450 |
| Viscosity, cps | 3440 | Acrylonitrile | 150 |
| | | Vazo 67 | 10 |
| | | Base Polyol | 1050 |
| | | Dispersion Properties | |
| | | Monomer conversion, % | 96.8 |
| | | Viscosity, cps | 3790 |
| | | Particle size, μ | 0.91 |
| | | Cent. solids, wt. % | 4.0 |

Many modifications may be made in the dispersants and the polymer polyols of this invention and their method of production without departing from the spirit and scope of the invention, which are defined only in the appended claims. For example, one skilled in the art could adjust the temperature, pressure, reactants, proportions and modes of addition within the parameters set forth to provide dispersants and polymer polyols with particularly advantageous properties. Multifunctional monomers other than those explicitly recited are anticipated as useful herein.

PREPARATION OF POLYURETHANE FOAMS

The polymer polyols prepared in accordance with the above examples can be incorporated into a formulation which results in a polyurethane product. Because the polymer polyols are stable and require relatively little amounts of the novel dispersants, they will be attractive alternatives to conventional polyols. The polymer polyol of the invention may be used in conjunction with a polyisocyanate or may be combined with additional polyols well known in the art, and reacted with a polyisocyanate to form a polyurethane foam product.

In order to form the polyurethane foam, a catalyst useful in preparing foams of this type is employed in the usual manner. Such catalyst may include those mentioned above, or one or more of the following:

(a) Tertiary amines such as trimethylamine; triethylamine; N-methylmorpholine; N-ethylmorpholine; N,N-dimethylbenzylamine; N,N-diemethylethanolamine; N,N,N',N'-tetramethyl-1,3-butanediamine; N,N-dimethylpiperazine; 1,4-diazobicyclo[2.2.2.]octane; triethylene diamine and the like;

(b) Tertiary phosphines such as trialkylphosphines; dialkylbenzylphosphines; and the like;

(c) Strong bases such as alkali and alkaline earth metal hydroxides; alkoxides; and phenoxides;

(d) Acidic metal salts of strong acids such as ferric chloride; stannic chloride; stannous chloride; antimony trichloride; bismuth nitrate and chloride, and the like;

(e) Chelates of various metals such as those which can be obtained from acetylacetone; benzoylacetone; trifluoroacetyl acetone; ethyl acetoacetate; salicylaldehyde; cyclopentanone-1-carboxylate; acetylacetoneimine; bisacetylacetonealkylenediamines; salicyclaldehydeimine; and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_4$, $Sn(OR)_4$, $Al(OR)_3$, and the like, wherein R is alkyl or aryl, and the reaction products of alcoholates with carboxylic acids, β-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 parts by weight percent based on 100 parts by weight of the polyol. More often the amount of catalyst used is 0.2 to 2.0 parts by weight.

As is well known, the polymer polyol component for the polyurethane foam is reacted in the presence of one or more of the above catalysts with a polyisocyanate according to conventional procedures. The polyisocyanate used may be any aromatic or aliphatic polyisocyanate, such as toluene diisocyanates, polymeric isocyanates and aliphatic diisocyanates. Typical aromatic polyisocyanates include, but are not limited to, m-phenylene diisocyanate; p-phenylene diisocyanate; polymethylene polyphenylisocyanate; 2,4-toluene diisocyanate; 2,6-toluene diisocyanate; dianisidine diisocyanate; bitolylene diisocyanate; naphthalene-1,4-diisocyanate; diphenylene-4,4'-diisocyanate; aliphatic-aromatic diisocyanates; such as xylene-1,4-diisocyanate; xylylene-1,2-diisocyanate; xylylene-1,3-diisocyanate; bis(4-isocyanatophenyl)-methane; bis(3-methyl-4-isocyanatophenyl)methane; and 4,4'-diphenylpropane diisocyanate. Suitable aliphatic diisocyanates would include isophorone diisocyanate; hexamethylene diisocyanate and methylene-bis-cyclohexylisocyanate. Toluene diisocyanates are preferred.

Aromatic polyisocyanates suitable for use include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyisocyanates and corresponding methylene-bridged polyphenyl polyisocyanates therefrom are described in the literature and in many patents.

Often, the most preferred methylene-bridged polyphenyl polyisocyanate mixtures used here contain from about 20 to about 100 wt. % methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5.

Foaming is carried out in the presence of water and, optionally, additional organic blowing agents. The water is normally used in amounts of 0.5 to 15 parts by weight, preferably, 1.0 to 10 parts by weight (pbw) based on 100 parts by weight of the polymer polyol and any additional polyol present. The organic blowing agents optionally used along with the water are known in the art and are, for example, monofluorotrichloromethane, difluorodichloromethane, methylene dichloride and others generally known in the art. Additives to regulate the cell size and the cell structure, for example, silicone surfactant such as dimethylpolysiloxanes, may also be added to the foaming mixture. Fillers, flame retarding additives, dyes or plasticizers of known types may also be used. These and other additives are well known to those skilled in the art.

The polymer polyols of the present invention would be useful in the preparation of slab and molded polyurethane foams.

| GLOSSARY | |
|---|---|
| Polyol A | Arcol ® 1342 polyl—A glycerin started polyether of propylene oxide capped with ethylene oxide containing 14% ethylene oxide having a hydroxyl number of 34 made by ARCO Chemical Co. |
| Polyol B | A glycerin initiated polyether of propylene oxide and ethylene oxide containing about 14% ethylene oxide with a hydroxyl number of 17 and containing essentially secondary hydroxyl groups. |
| Polyol C | Arcol ® 1131 polyol—A glycerin started polyether of propylene oxide and ethylene oxide containing 12% random ethylene oxide having a hydroxyl number of 48 made by ARCO Chemical Co. |
| Polyol D | A glycerin initiated polyether of propylene oxide and ethylene oxide containing 13.9% random ethylene oxide having a hydroxyl number of 17 and an unsaturation content of 0.074 meq/g. |
| Vazo ® 67 | 2,2'-Azo-bis(2-methylbutanenitrile) polymerization catalyst made by E. I. duPont de Nemours and Co. |

What is claimed is:

1. Polymer polyols produced by a process comprising the steps of:
    polymerizing, via a free-radical reaction, at least a first monomer having at least two ethylenically unsaturated sites, in the presence of a polyoxyalkylene polyether polyol having a molecular weight within the range of from about 500 to about 15,000, to produce a dispersant; and
    polymerizing, via a free-radical reaction, a second monomer in the presence of a base polyol and the dispersant, where the second monomer is different from the first monomer, where the dispersant exhibits a dispersant effect and the second monomer is not the same as the first monomer.

2. The polymer polyols of claim 1 where the first monomer has the structure selected from the group consisting of:

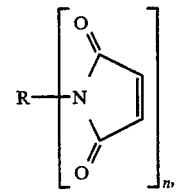

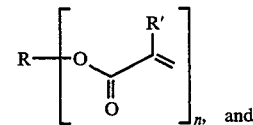

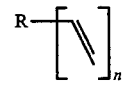

where R is selected from the group of organic moieties consisting of alkyl, aryl, alkylaryl groups and alkyl, aryl or alkyl aryl groups linked by a hetero atom-containing group; R' is selected from the group consisting of hydrogen and methyl; and n is at least 2.

3. The polymer polyols of claim 2 where in the dispersant definition R is selected from the group consisting of:

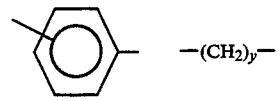

where X is selected from the group consisting of O, $SO_2$, C=O, $CH_3$, $C(CH_3)_2$, and $C(CF_3)_2$; y ranges from about 1 to about 24; z ranges from about 1 to about 100; and B is selected from the group consisting of hydrogen and methyl.

4. The polymer polyols of claim 1 where the first monomer is a bismaleimide.

5. The polymer polyols of claim 1 where the first monomer has at least two reactive acrylate groups.

6. The polymer polyol of claim 5 where the monomer is selected from the group consisting of trimethylolpropane triacrylate; trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; tripropylene glycol dimethacrylate; polypropylene glycol diacrylate; polyethylene glycol diacrylate; butanediol diacrylate; butanediol dimethacrylate; pentaerythritol triacrylate; pentaerythritol tetraacrylate; ethoxylated bisphenol A diacrylate; hexane diol diacrylate; dipentaerythritol monohydroxypentaacrylate; neopentyl glycol diacrylate; neopentyl glycol dimethacrylate; tris(2-hydroxyethyl)isocyanurate triacrylate and mixtures thereof.

7. The polymer polyols of claim 1 where the proportion of first monomer in the total dispersant ranges from about 0.1 to about 10 wt. %.

8. The polymer polyols of claim 1 where the proportion of dispersant ranges from about 0.5 to about 30 wt. % of the total polyols.

9. The polymer polyols of claim 1 where the second monomer is a combination of styrene and acrylonitrile in a ratio of styrene to acrylonitrile ranging from about 40/60 to about 100/0, and having a solids content of 55% or less.

10. A process of producing polymer polyols comprising the steps of:
polymerizing, via a free-radical reaction, at least a first monomer having at least two ethylenically unsaturated sites, in the presence of a polyoxyalkylene polyether polyol having a molecular weight within the range of from about 500 to about 15,000, to produce a dispersant; and
polymerizing, via a free-radical reaction, a second monomer in the presence of a base polyol and the dispersant, where the second monomer is different from the first monomer, and where the dispersant exhibits a dispersant effect.

11. The process of claim 10 where the first monomer has the structure selected from the group consisting of:

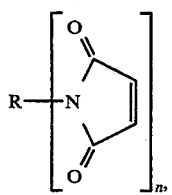

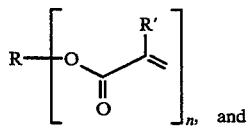

and

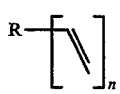

where R is selected from the group of organic moieties consisting of alkyl, aryl, alkylaryl groups and alkyl, aryl or alkyl aryl groups linked by a hetero atom-containing group; R' is selected from the group consisting of hydrogen and methyl; and n is at least 2.

12. The process of claim 11 where in the dispersant definition R is selected from the group consisting of:

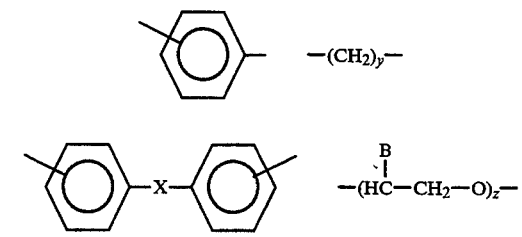

where X is selected from the group consisting of O, $SO_2$, $C=O$, $CH_3$, $C(CH_3)_2$, and $C(CF_3)_2$; y ranges from about 1 to about 24; z ranges from about 1 to about 100; and B is selected from the group consisting of hydrogen and methyl.

13. The process of claim 10 where the first monomer is a bismaleimide.

14. The process of claim 10 where the first monomer has at least two reactive acrylate groups.

15. The polymer polyol dispersant of claim 14 where the monomer is selected from the group consisting of trimethylolpropane triacrylate; trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; tripropylene glycol dimethacrylate; polypropylene glycol diacrylate; polyethylene glycol diacrylate; butanediol diacrylate; butanediol dimethacrylate; pentaerythritol triacrylate; pentaerythritol tetraacrylate; ethoxylated bisphenol A diacrylate; hexane diol diacrylate; dipentaerythritol monohydroxypentaacrylate; neopentyl glycol diacrylate; neopentyl glycol dimethacrylate; tris(2-hydroxyethyl) isocyanurate triacrylate and mixtures thereof.

16. The process of claim 10 where the proportion of first monomer in the total dispersant ranges from about 0.1 to about 10 wt. %.

17. The process of claim 10 where the proportion of dispersant ranges from about 2 to about 5 wt. % of the total polyols.

18. The process of claim 10 where the second monomer is a combination of styrene and acrylonitrile in a ratio of styrene to acrylonitrile ranging from about 40/60 to about 100/0, and having a solids content of 55% or less.

19. Polymer polyols comprising:
a continuous phase comprising a polyol;
a dispersant, made by a process comprising polymerizing, via a free-radical reaction, at least a first monomer having at least two ethylenically unsaturated sites, in the presence of a polyoxyalkylene polyether polyol having a molecular weight within the range of from about 500 to about 15,000; and
a disperse phase comprising polymer particles from a second monomer, where the second monomer is different from the first monomer, and where the dispersant exhibits a dispersant effect.

20. The polymer polyols of claim 19 where the first monomer has the structure selected from the group consisting of:

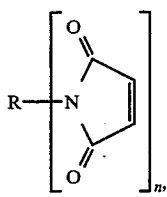

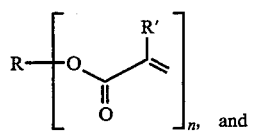

and

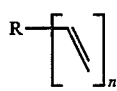

where R is selected from the group of organic moieties consisting of alkyl, aryl, alkylaryl groups and alkyl, aryl or alkyl aryl groups linked by a hetero atom-containing group; R' is selected from the group consisting of hydrogen and methyl; and n is at least 2.

21. The polymer polyols of claim 20 where in the dispersant definition R is selected from the group consisting of:

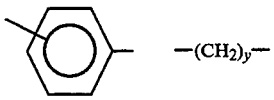

where X is selected from the group consisting of O, SO, C=O, $CH_3$, $C(CH_3)_2$, and $C(CF_3)_2$; y ranges from about 1 to about 24; z ranges from about 1 to about 100; and B is selected from the group consisting of hydrogen and methyl.

22. The polymer polyols of claim 19 where the first monomer is a bismaleimide.

23. The polymer polyols of claim 19 where the first monomer has at least two reactive acrylate groups.

24. The polymer polyol of claim 23 where the monomer is selected from the group consisting of trimethylolpropane triacrylate; trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; tripropylene glycol dimethacrylate; polypropylene glycol diacrylate; polyethylene glycol diacrylate; butanediol diacrylate; butanediol dimethacrylate; pentaerythritol triacrylate; pentaerythritol tetraacrylate; ethoxylated bisphenol A diacrylate; hexane diol diacrylate; dipentaerythritol monohydroxypentaacrylate; neopentyl glycol diacrylate; neopentyl glycol dimethacrylate; tris(2-hydroxyethyl)isocyanurate triacrylate and mixtures thereof.

25. The polymer polyols of claim 19 where the proportion of first monomer in the total dispersant ranges from about 0.1 to about 10 wt. %.

26. The polymer polyols of claim 19 where the proportion of dispersant ranges from about 0.5 to about 30 wt. % of the total polyols.

27. The polymer polyols of claim 19 where the second monomer is a combination of styrene and acrylonitrile in a ratio of styrene to acrylonitrile ranging from about 40/60 to about 100/0, and having a solids content of 55% or less.

28. A polymer polyol dispersant produced by a process comprising polymerizing, via a free-radical reaction, at least one first monomer having at least two ethylenically unsaturated sites, in the presence of a polyoxyalkylene polyether polyol having a molecular weight within the range of from about 500 to about 15,000, where the polymer polyol dispersant produced thereby has dispersant effect when employed in a subsequent polymer polyol employing a second monomer different from the first monomer and wherein said first monomer is a bis-maleimide.

29. A polymer polyol dispersant produced by a process comprising polymerizing, via a free-radical reaction, at least one first monomer having at least two ethylenically unsaturated sites, in the presence of a polyoxyalkylene polyether polyol having a molecular weight within the range of from about 500 to about 15,000, where the polymer polyol dispersant produced thereby has a dispersant effect when employed in a subsequent polymer polyol employing a second monomer different from the first monomer and wherein said first monomer has at least two acrylate groups.

30. The polymer polyol dispersant of claim 29 where the monomer is selected from the group consisting of trimethylolpropane triacrylate; trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; tripropylene glycol dimethacrylate; polypropylene glycol diacrylate; polyethylene glycol diacrylate; butanediol diacrylate; butane diol dimethacrylate; pentaerythritol triacrylate; pentaerythritol tetraacrylate; ethoxylated bisphenol A diacrylate; hexane diol diacrylate; dipentaerythirtol monohydroxypentaacrylate; neopentyl glycol diacrylate; neopentyl glycol dimethacrylate; tris(2-hydroxyethyl) isocyanurate triacrylate and mixtures thereof.

31. A polymer dispersant produced by a process comprising polymerizing, via a free-radical reaction, at least one first monomer having in the presence of a polyoxyalkylene polyether polyol having a molecular weight within the range of from about 500 to about 15,000, where the first monomer is bis-maleimide and where the proportion of monomer in the total dispersant ranges from about 0.1 to about 10 wt. %, and where the polymer polyol dispersant produced thereby has dispersant effect when employed in a subsequent polymer polyol employing a second monomer different from the first monomer.

32. A polymer polyol dispersant produced by a process comprising polymerizing, via a free-radical reaction, at least one first monomer having in the presence of a polyoxyalkylene polyether polyol having a molecular weight within the range of from about 500 to about 15,000, where the first monomer is selected from the group consisting of trimethylolpropane triacrylate; trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol diacrylate; polyethylene glycol diacrylate; butanediol diacrylate; butane diol dimethacrylate; pentaerythritol triacrylate; pentaerythritol tetraacrylate; ethoxylated bisphenol A diacrylate; hexane diol diacrylate; dipentaerythritol monohydroxypentaacrylate; neopentyl glycol diacrylate; neopentyl glycol dimethacrylate; tris(2-hydroxyethyl) isocyanurate triacrylate and mixtures thereof and where the proportion of monomer in the total dispersant ranges from about 0.1 to about 10 wt. %, and where the polymer polyol dispersant produced thereby has dispersant effect when employed in a subsequent polymer polyol employing a second monomer different from the first monomer.

33. A process for producing a polymer polyol dispersant comprising polymerizing, via a free-radical reaction, at least one first monomer having at least two ethylenically unsaturated sites, in the presence of a polyoxyalkylene polyether polyol having a molecular weight within the range of from about 500 to about 15,000, where the polymer polyol dispersant produced thereby has dispersant effect when employed in a subsequent polymer polyol employing a second monomer different from the first monomer and wherein the said first monomer is a bis-maleimide.

34. A process for producing a polymer polyol dispersant comprising polymerizing, via a free-radical reaction, at least one first monomer having at least two ethylenically unsaturated sites, in the presence of a polyoxyalkylene polyether polyol having a molecular weight within the range of from about 500 to about 15,000, where the polymer polyol dispersant produced thereby has dispersant effect when employed in a subsequent polymer polyol employing a second monomer different from the first monomer and wherein said first monomer has at least two reactive groups.

35. The process of claim 34 where the monomer is selected from the group consisting of trimethylolpropane triacrylate; trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; polyethylene glycol diacrylate; butanediol diacrylate; butane diol dimethacrylate; pentaerythritol triacrylate; pentaerythritol tetraacrylate; ethoxylated bisphenol A diacrylate: hexane diol diacrylate; dipentaerythritol monohydroxypentaacrylate: neopentyl glycol diacrylate; neopentyl glycol dimethacrylate; tris(2-hydroxyethyl) isocyanurate triacrylate and mixtures thereof.

* * * * *